(12) United States Patent
Sándor

(10) Patent No.: US 12,060,683 B2
(45) Date of Patent: Aug. 13, 2024

(54) ELECTROSLAG STRIP CLADDING

(71) Applicant: ESAB AB, Gothenburg (SE)

(72) Inventor: Tamás Sándor, Biatorbágy (HU)

(73) Assignee: ESAB AB, Gothenburg (SE)

( * ) Notice: Subject to any disclaimer, the term of this patent is extended or adjusted under 35 U.S.C. 154(b) by 1122 days.

(21) Appl. No.: 16/820,874

(22) Filed: Mar. 17, 2020

(65) Prior Publication Data
US 2021/0292976 A1    Sep. 23, 2021

(51) Int. Cl.
*E01B 5/08*      (2006.01)
*B23K 25/00*    (2006.01)

(52) U.S. Cl.
CPC ............... *E01B 5/08* (2013.01); *B23K 25/00* (2013.01)

(58) Field of Classification Search
CPC ....... B23K 25/00; B23K 25/005; B23K 9/188
See application file for complete search history.

(56) References Cited

U.S. PATENT DOCUMENTS

| | | |
|---|---|---|
| 3,139,364 A | 6/1964 | Fiechter |
| 4,144,442 A | 3/1979 | Augustin et al. |
| 4,442,340 A * | 4/1984 | Kawabata ............... B23K 9/188 219/73 |
| 4,828,015 A | 5/1989 | Takeuchi et al. |
| 6,570,118 B2 | 5/2003 | Sauron et al. |
| 7,883,025 B2 | 2/2011 | Sundgren |
| 7,954,611 B2 | 6/2011 | Woempner et al. |
| 8,367,960 B2 | 2/2013 | Keefe |
| 9,566,644 B2 | 2/2017 | Patrick et al. |
| 2008/0061039 A1* | 3/2008 | Danks ................... B23K 25/00 219/73.1 |
| 2011/0297752 A1* | 12/2011 | Keefe ..................... B23P 6/00 29/402.13 |
| 2017/0051373 A1 | 2/2017 | Ueda et al. |
| 2017/0233954 A1 | 8/2017 | Lindemulder et al. |

(Continued)

FOREIGN PATENT DOCUMENTS

| | | |
|---|---|---|
| CN | 101144160 A | 3/2008 |
| CN | 102146563 A | 8/2011 |

(Continued)

OTHER PUBLICATIONS

Notification of Transmittal of International Search Report and Written Opinion including International Search Report and Written Opinion dated Jun. 28, 2021, 13 pages.

*Primary Examiner* — Geoffrey S Evans
(74) *Attorney, Agent, or Firm* — Edell, Shapiro & Finnan, LLC

(57) ABSTRACT

A method and system for electroslag strip cladding (ESSC) of rail heads without preheating utilizing twin electroslag strip welding techniques. The twin ESSC techniques include depositing a layer of wear and corrosion resistance cladding material onto the entire running surface of the rail head at a relatively fast welding speed of approximately sixty cm/minute with less than one cm/meter of distortion. The welding speed is achieved by moving a twin ESSC welding head along a rail, with the running surface of the rail head facing upward, or advancing a rail through a space under the twin ESSC welding head, with the running surface of the rail head facing upward, while cladding material is deposited continuously onto the running surface of the rail head.

19 Claims, 9 Drawing Sheets

(56) References Cited

U.S. PATENT DOCUMENTS

2018/0291563 A1    10/2018  Murphy
2018/0361496 A1*   12/2018  Raudsepp .............. B23K 9/188

FOREIGN PATENT DOCUMENTS

| | | |
|---|---|---|
| CN | 107876949 A | 4/2018 |
| CN | 107931826 A | 4/2018 |
| EP | 0906452 B1 | 10/2001 |
| EP | 1878528 A2 | 1/2008 |
| FR | 2697452 B1 | 1/1995 |
| JP | S58122193 A | 7/1983 |

\* cited by examiner

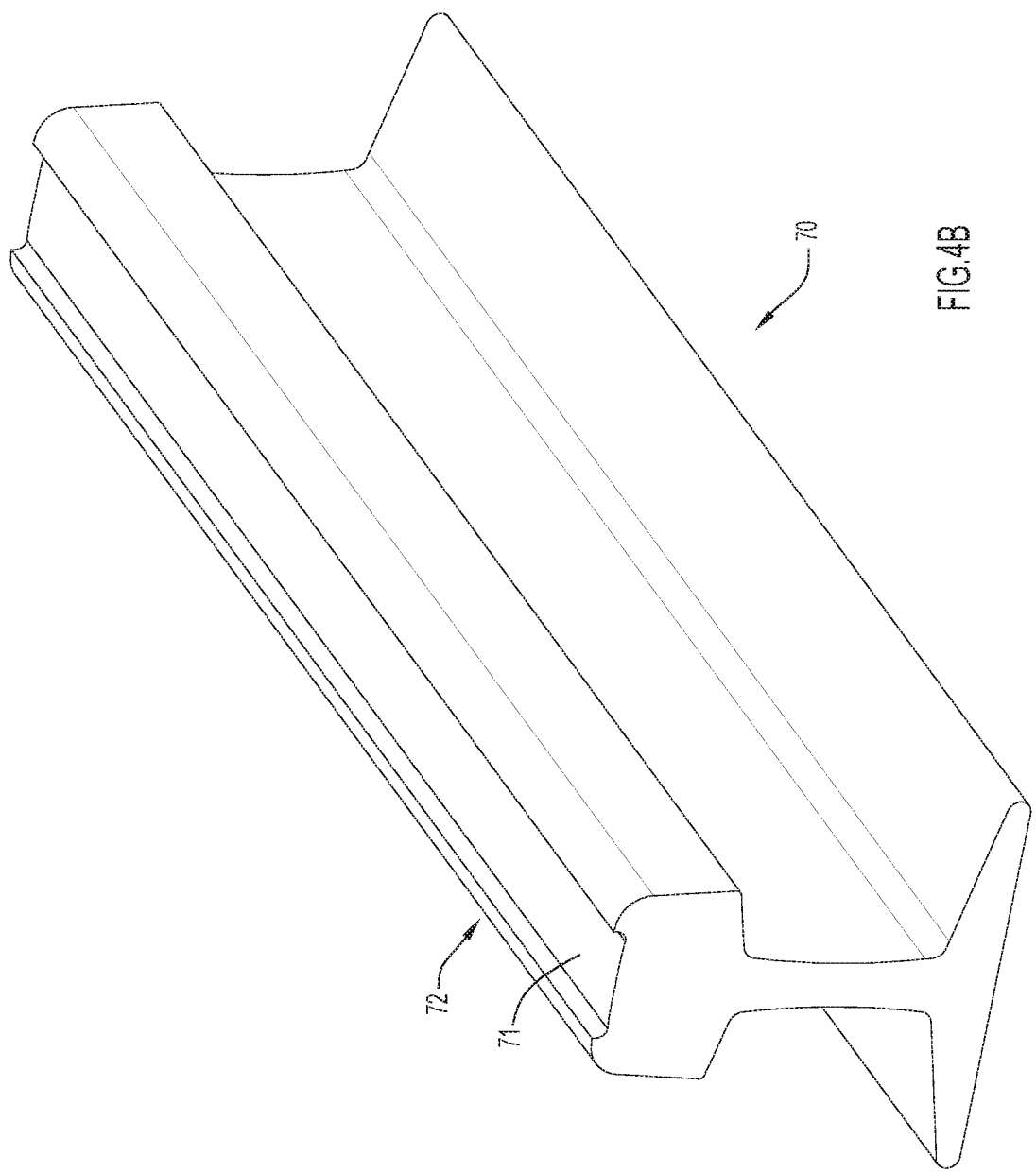

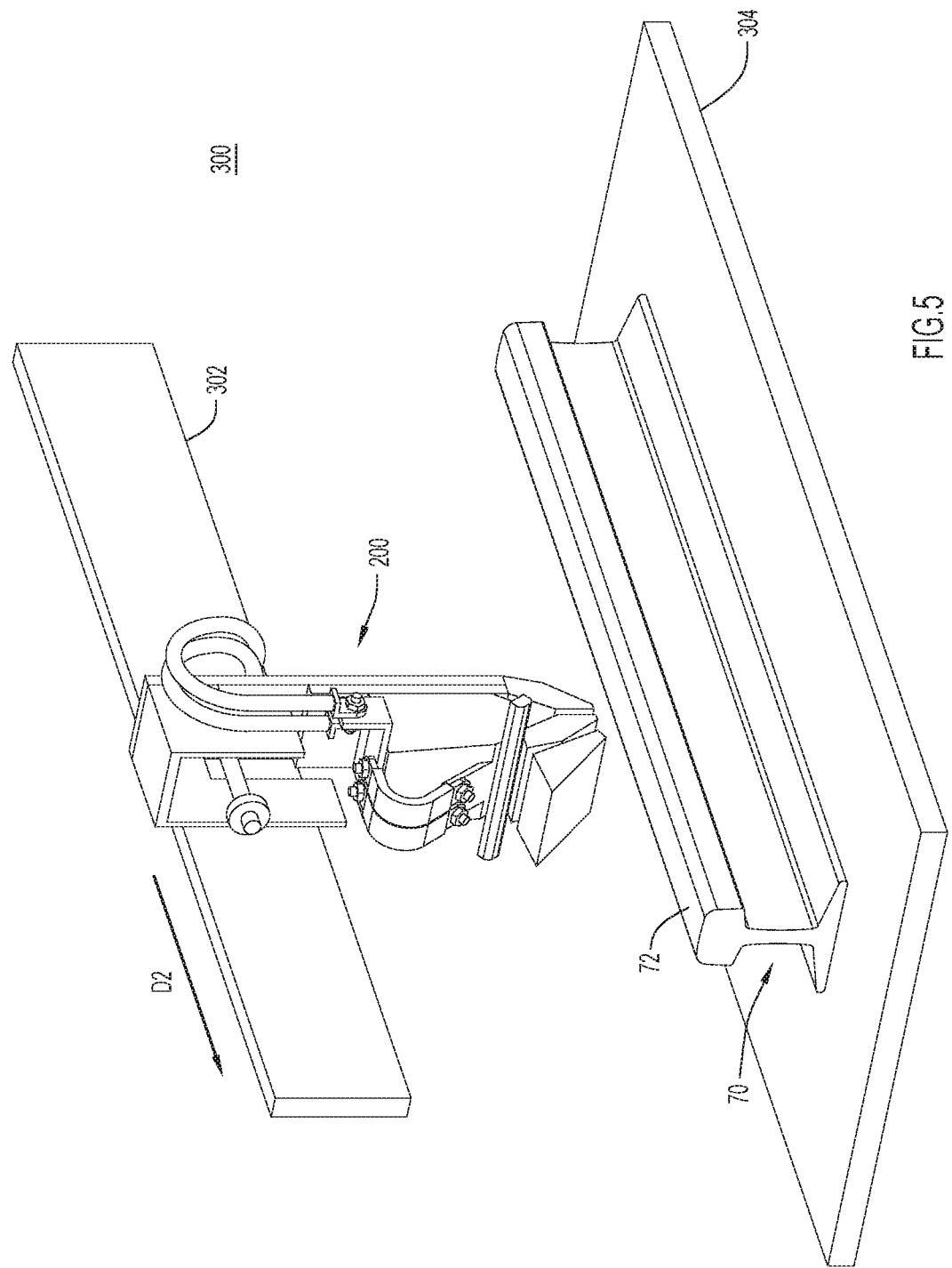

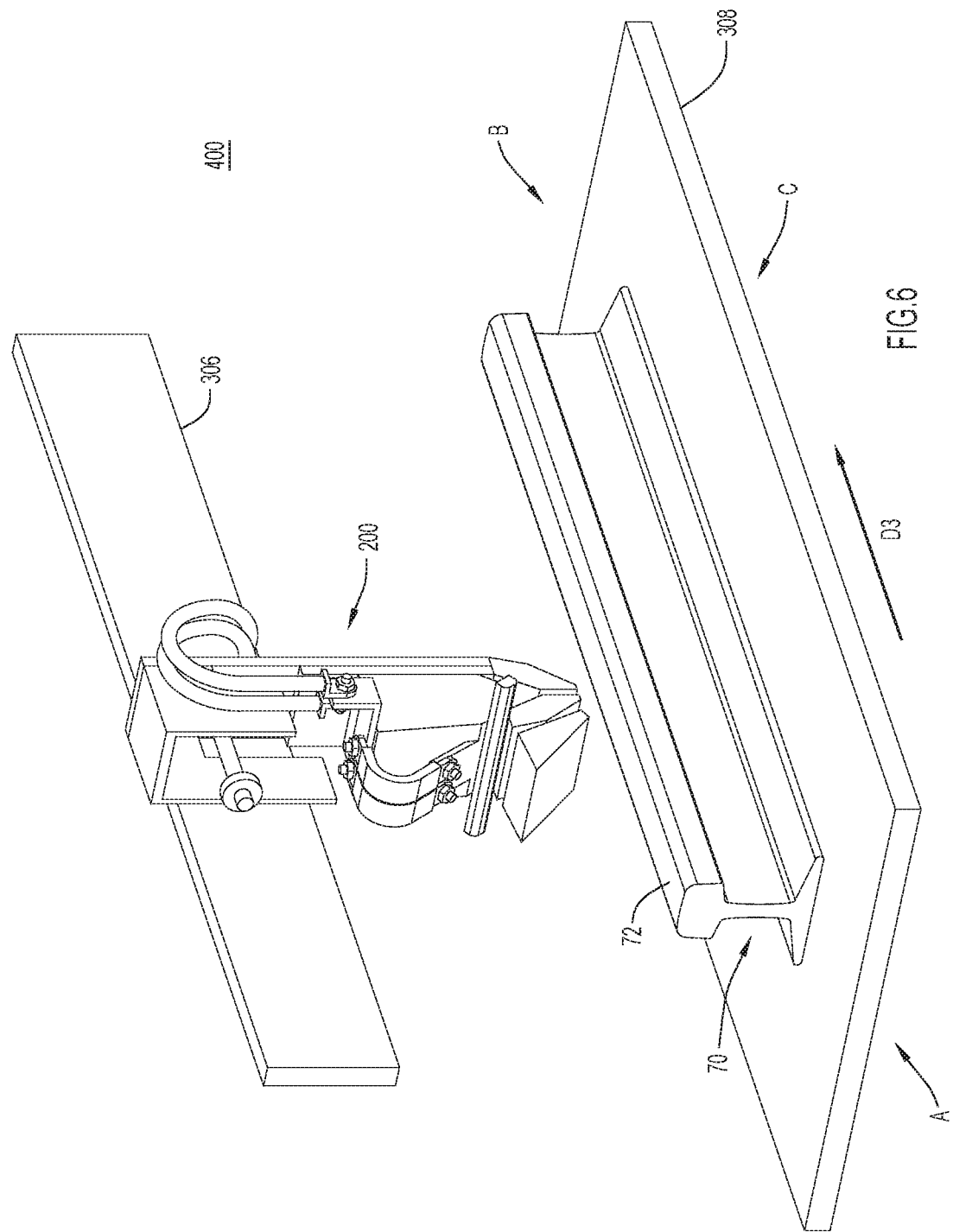

ELECTROSLAG STRIP CLADDING

TECHNICAL FIELD

The present disclosure is directed toward electroslag strip cladding and, in particular, toward electroslag strip cladding of rail heads without preheating utilizing twin electroslag strip welding techniques.

BACKGROUND

The top of a railway rail frequently comes in contact with the wheels of trains, trams, trolleys, etc., thus is subject to extensive wear. In sidings where the rails are exposed to lower traffic frequency they might be subject to excessive corrosion, e.g., rust formation. Thus, rails in sidings are often welded (e.g., with zigzag weld beads) to increase lifetime and limit corrosion and ensure electrical conductivity for a signaling system of railroad road crossings. In general, when rail steel grades are welded, they need to be heated up to 350-450° C. temperature in order to avoid detrimental microstructure transformations that may cause rail breaks and may result in train, tram and/or trolley derailment. Thus, heating (called preheating prior to rail welding) is typically mandatory at every Railway Administration when the rail steel is subjected to welding. Additionally, when a rail head's top (or running) surface is welded on relatively long sections of rail (above 1000 mm in length), the rail steel usually becomes distorted without pre-stretching. Typically, the distortion value can be around 3-4 cm/meter rail length.

Accordingly, improved rail head manufacturing methods and/or systems that can ameliorate the above described problems in a reliable, efficient and cost effective manner are desired.

SUMMARY

An example embodiment of the invention described in the present disclosure fulfills the above needs by employing an electroslag strip cladding (ESSC or ESC) technique that utilizes a twin-strip electroslag strip cladding (ESSC or ESC) welding process to deposit a layer of cladding material on the top of rails. By using the twin-strip ESSC welding process, the layer of cladding material can be deposited atop a region of the top surface (i.e., a running surface) of the rails at a relatively quick welding speed (e.g., a minimum welding speed of approximately 60 cm/minute) with less distortion (e.g., less than 1 cm/meter, such as 2.6 mm/m). Moreover, the twin-strip ESSC welding process requires no preheating of the rail steel prior to welding while reducing rail distortion below 20 mm/m (e.g., 2.6 mm/m).

According to another example embodiment of the present invention presented herein, the ESSC welding process uses stainless steel strip (however, other corrosion resistant alloy material may be used as well) as the cladding material since stainless steel can prevent and/or eliminate the formation of rust on the rail head after cladding.

In one example embodiment of the present invention presented herein, improved welding speed can be achieved by moving an ESSC welding head along a rail (e.g., on a rail car) or pulling a rail through a space under the ESSC welding head. When a pull-through type rail transfer system is employed, the ESSC welding head is stationary above the rail and a pull-through system may grab a long rail (e.g., an 18 m long rail) and pull the rail under the twin-strip ESSC welding head while the cladding is conducted continuously. Either way, the cladding material deposited atop the rails provides electrical connectivity, and sound damping for the rail.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 4B is a schematic perspective view of the rail of FIG. 4A depicting the machined-out groove of the rail head prior to cladding material being deposited therein by the techniques presented herein, according to an example embodiment of the present invention.

FIG. 5 is a schematic perspective view depicting the example twin ESSC apparatus of FIG. 3 movably disposed above an exemplary rail such that the techniques presented herein may be employed to clad a rail head, according to an example embodiment of the present invention.

FIG. 6 is a schematic perspective view depicting an exemplary rail moving under the example twin ESSC apparatus of FIG. 3 such that the techniques presented herein may be employed to clad a rail head, according to an example embodiment of the present invention.

Like numerals identify like components throughout the figures.

DETAILED DESCRIPTION

Figure 1:
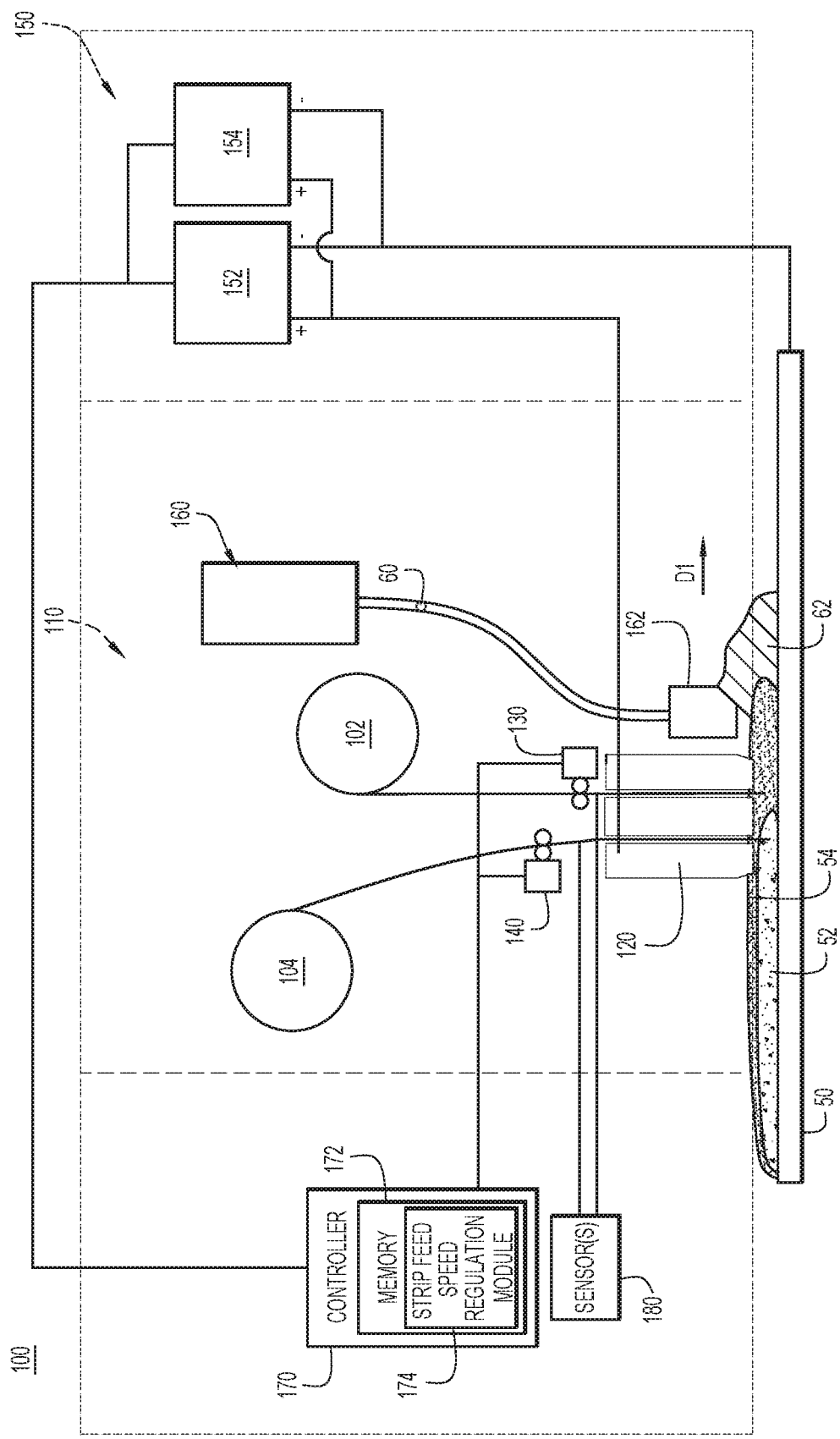
FIG. 1 is a diagram illustrating a cladding environment in which the techniques presented herein may be employed to clad a work piece, according to an example embodiment of the present invention.

Cladding is a fundamental process to the manufacturing and fabrication industries and is used across many applications, including petrochemical, oil and gas, pressure vessel and boiler making. The process of cladding involves putting a new layer on top of an existing work piece—sometimes to repair items, other times to improve the wear resistance or corrosion properties of the piece.

The process of cladding is often used when there is a need to use mild or low-alloy steel for the main structure with a specially alloyed material applied to a certain portion of the work piece to accommodate necessary properties. It is more cost effective to apply the special alloy layer only where needed, rather than fabricating the entire structure from the more expensive specially alloyed material. Strip cladding processes offer an effective solution in these situations, especially electroslag strip cladding (ESSC) processes since ESSC offers a high disposition rate, particularly where the part to be cladded can accommodate the higher rate of deposition and heat input.

Before detailing aspects of the example embodiments of the present invention, an exemplary electroslag strip cladding (ESSC) process will be described below to provide a better understanding of the process.

Basically, electroslag strip cladding (ESSC) is a development of submerged arc strip cladding that is based on the ohmic resistance heating of an electrically conductive slag to create a pool of molten slag. During ESSC operations, there is no arc between the strip electrode and the parent or base material (i.e., the work piece). Instead, heat generated by the pool of molten slag (which, in some instances, is referred to as a welding bath) melts the surface of a base material, an edge of a strip electrode submerged in the molten slag, and flux (which protects the molten slag pool and degasses a welding head being used for the ESSC process). In order to operate with the molten slag pool, which may be maintained at a temperature of approximately 2,300° C., a plating or cladding head is utilized to guide one or more metal strips to the molten pool of slag. The plating (cladding) head is usually a water-cooled, heavy duty head. The plating (cladding) head also usually includes a motorizing driving roll for strip feeding.

The utilization of a molten slag pool, as opposed to an arc, makes ESSC a reliable high deposition rate process suitable for cladding operations (which apply welded deposits over a large surface area). By comparison, submerged arc cladding creates significantly more dilution than the 7-10% dilution typically produced with ESSC (e.g., 50-100% more dilution than ESSC for the same heat input). Moreover, ESSC provides a higher deposition rate (i.e., the rate at which weld metal is actually deposited onto the work piece surface) and creates less penetration as compared to submerged arc cladding. For at least these reasons, ESSC may be preferable to submerged arc cladding when surfacing or cladding flat and curved objects such as heat exchangers, tubes, tube sheets and various pressure vessels. That being said, ESSC is still quite expensive and, thus, any improvements to the efficiency, productivity, dilution, etc. of ESSC are desirable.

More specifically, ESSC costs are typically driven by the cost of the equipment, most notably the plating head and feeding system, and the material utilized for the cladding. In fact, cladding techniques primarily exist because forming a part, vessel, plate, etc. entirely from a cladding material is often considerably more expensive than forming the part from an inexpensive material and cladding the part with the cladding material. Consequently, any developments in equipment or feeding systems that increase efficiency, quality, productivity, or otherwise minimize the amount of time and material required for cladding are highly desirable.

For example, in order to increase productivity, some cladding heads now accommodate two strips and introduce both strips into the same molten slag pool. Introducing two strips into the molten slag pool may extend the length of the molten slag pool (e.g., the introduction of a second strip may extend a slag pool approximately 20-35 mm) so that the molten slag pool begins to solidify approximately 20-25 mm after the trailing strip (i.e., the second strip). This may encourage the formation of flat beads and proper links during ESSC. Moreover, a head that accommodates two strips may increase the deposition rate (thereby increasing productivity), decrease dilution, and allow for unique cladding compositions (e.g., by mixing different strips).

Turning to FIG. 1, an example cladding environment 100 in which the techniques presented herein may be employed will now be described. In environment 100, various components of a cladding apparatus 110 are illustrated performing ESSC operations on a work piece 50 (e.g., a low alloy carbon steel rail head). The apparatus 110 is a twin ESSC apparatus (i.e., a twin ESSC plating or cladding head; also referred to herein as an ESSC welding head) and thus, is configured to guide or feed a first strip of cladding material 102 and a second strip of cladding material 104 towards the work piece 50. More specifically, in the depicted embodiment, the apparatus 110 includes a first strip feeder 130 that is configured to feed the first strip 102 to a contact jaw 120 and a second strip feeder 140 that is configured to feed the second strip 104 to the same contact jaw 120. The contact jaw 120 then guides strips 102 and 104 towards the work piece 50. However, in other embodiments, the strips need not be fed to the same contact jaw (or even be fed through the same cladding head) and, instead, may be fed to separate jaws (or heads). Along the same lines, in other embodiments, that apparatus may guide or feed more than two strips to the work piece 50. In fact, in some embodiments, any number of strips may be fed to any number of jaws/heads, with any combination of strips being fed to any of the jaws/heads (e.g., two strips for each of two heads that each include a single jaw).

In the depicted embodiment, strips 102 and 104 are arranged as "twin strips" because the strips are fed in parallel, as a double strip arrangement. However, the term parallel is not intended to imply that strips 102 and 104 are fed at the same rate by their respective feeders 130 and 140. Instead, as is explained below, strips 102 and 104 may be fed at different rates. In order to feed strips 102 and 104, feeders 130 and 140 may each include any parts or components that move strips 102 and 104 towards the work piece 50 (via the jaw 120). For example, feeders 130 and 140 may include grooved wheels driven by a driving unit, such as an electric motor. In embodiments utilizing grooved wheels, two grooved wheels may engage either side of each strip and rotate in opposite directions to move a strip towards the work piece 50. The grooved wheels may be coupled to driving motors via any desirable drive shaft, power train, gearing arrangement, or other such mechanical coupling that allows rotational energy to be imparted to the feeders.

Moreover, in the depicted embodiment, the first strip of material 102 and the second strip of material 104 are each provided as spools or coils of cladding material (e.g., spools of metal strips with a width of 45 mm and a thickness of 0.5 mm). Consequently, the first feeder 130 and second feeder 140 unwind or unspool the first strip 102 and the second strip 104 as the feeders 130 and 140 feed strips 102 and 104 to the work piece 50 via the contact jaw 120. Although not shown, in some embodiments feeder 130 and/or feeder 140 may include or be coupled to a straightener or straightening unit configured to straighten and/or align a strip as it is drawn from its coil/spool (i.e., as strip 102 or 104 approaches grooved wheels of feeder 130 or 140, respectively). However, in other embodiments, the strips can be fed from any desirable reservoir and feeders 130 and 140 need not unwind or unspool strips 102 and 104 while feeding the strips.

Once strips 102 and 104 are fed to the contact jaw 120, the contact jaw 120 aligns strips 102 and 104 in the welding direction D1 so that the apparatus guides strips 102 and 104 to the same portion of the work piece 50 as the cladding operations move in the welding direction D1. That is, strips 102 and 104 are spaced a distance from each other in the welding direction D1, insofar as "welding direction" is the direction in which a weld is intended to run (e.g., the welding direction may be the direction of movement of a cladding head). Consequently, the first strip 102 may be referred to as the leading strip 102 and the second strip 104 may be referred to as the trailing strip 104. However, in other embodiments, two or more strips can be arranged in various settings or formations. For instance, strips can be disposed along an axis that is perpendicular to the welding direction D1, spaced different distances from each other in the welding direction, or a combination thereof.

In the event two or more strips are spaced along an axis that is perpendicular to the welding direction D1 (i.e., spaced along a "transverse axis"), the strips may be positioned side by side, for example, to clad a wide span at once. By comparison, when the strips are aligned in the welding direction D1 (like strips 102 and 104), the strips may perform different roles in a single cladding pass and/or form a cladding layer with a mixed composition (e.g., if the different strips are different materials). Still further, in some embodiments, a plurality of strips may be arranged in a grid-like arrangement so that at least some of the plurality of strips are spaced along a transverse axis and other strips are aligned in the welding direction D1 (e.g., to provide a specific welding composition over a wide span).

Still referring to FIG. 1, the apparatus 110 also includes a flux hopper 160 that is a repository for flux 60 and is configured to selectively deliver flux 60 to a flux drop 162 disposed adjacent to the contact jaw 120. Fluxes are generally granular fusible minerals typically containing oxides of manganese, silicon, titanium, aluminum, calcium, zirconium, magnesium and other compounds, such as calcium fluoride. The role of the flux 60 in ESSC is described in further detail below, but, generally, the flux 60 helps to produce a metal weld 52 with a specific chemical composition and specific mechanical properties under a layer of slag 54. That is, the flux 60 is specially formulated to be compatible with a given strip or strips of cladding material so that the combination of flux and the strip(s) produces desired mechanical properties. In the depicted embodiment, flux 60 is delivered by a nozzle of the flux drop 162 on the leading edge of the contact jaw 120 to produce a protective layer 62 over a molten slag pool, as is described in further detail below. Additionally or alternatively, flux may be delivered to the trailing edge of the contact jaw 120 to provide a layer of flux over any molten slag included above the metal weld 52 (e.g., the apparatus 110 may include a second or repositioned hopper 160 and drop 162).

The apparatus 110 also comprises a power source 150, a controller 170, and one or more sensors 180. These components are each shown in dashed boxes connected to the dashed box of apparatus 110 because these components may be included in apparatus 110 (e.g., included during manufacturing of apparatus 110) or connected thereto (e.g., retrofitted to the apparatus 110 and/or connected via a wired or wireless connection). For example, the operations of controller 170 may be executed by components included in the power source 150 (e.g., the controller 170 may be a user interface and the power source 150 may regulate feed speed of strips 102 and 104). Each of these components is addressed in turn below.

First, the power source 150 may be included in or connected to the apparatus 110 and may include any number or type of power sources, such as a welding converter, a welding transformer, a rectifier, a thyristor controlled rectifier or an inverter. As an example, power source 150 may include two parallel direct current (DC) power sources 152 and 154 that are each connected to the apparatus 110. Regardless of how the power source 150 is provided, the power source 150 provides a current to the contact jaw 120 that flows into any strip(s) fed therethrough. The current is transferred to the entire surface area of the strip(s) in contact with the contact jaw 120 and, importantly, the current is applied individually to each strip of material passing through a cladding head. However, since the current is from a single source (even if the source comprises multiple components in parallel, like source 150), each strip receives the same magnitude of current. That is, strip 102 and 104 may receive approximately equal amounts of current individually (dependent on localized resistance levels in the molten slag). The current from each strip passes into the layer of electrically conductive slag 54 and, as is described in further detail below in connection with FIG. 2, the resistance of the slag 54 generates heat as the slag 54 receives current to effectuate the cladding process (e.g., the temperature of the slag adjacent the strip(s) providing current may be approximately 2,300° C.).

Second, the controller 170 is connected to the apparatus 110 and configured to control the first feeder 130 and the second feeder 140 in the manner described in connection with FIGS. 4-6 discussed in U.S. Patent Application Publication No. 2018/0361496, the entire disclosure of which is incorporated herein by reference. More specifically, the controller 170 includes a memory 172 with a strip feed speed regulation module 174 and the strip feed speed regulation module 174 is configured to perform the operations discussed in connection with FIGS. 4-6 of the aforementioned U.S. patent application Publication. In some embodiments, the controller 170 is local to the apparatus 110; however, in other embodiments, the controller 170 may be remote from the apparatus 110 and may be connected thereto via a network connection (e.g., a network connection formed by a communication interface included in the controller 170, as is described in further detail in connection with FIG. 7 of the aforementioned U.S. patent application Publication. An example computing device that is representative of controller 170 is described in connection with FIG. 7 of the aforementioned U.S. patent application Publication.

Third, the apparatus 110 may include or be coupled to one or more sensors 180. The sensor(s) are configured to measure the feed speed of at least the leading strip 102, but may also measure the feed speed of two or more strips, such as the leading strip 102 and the trailing strip 104. The sensor(s) 180 may measure the feed speed by measuring the speed with which a strip passes through the contact jaw 120, the speed with which a spool of the strip unwinds (e.g., a pulse sensor may count rotations of a strip coil), or any other parameter that is indicative of speed, such as motor parameters (e.g., motor parameters of motors in feeders 130 and 140), welding current, etc. Sensor(s) 180 may also measure or monitor any welding parameters, which are described in further detail in the aforementioned U.S. patent application Publication, including voltage, current, and other electrical parameters. For example, sensor(s) 180 may include one or more shunts in the power source to measure electrical parameters. The sensor(s) 180 may send any data to the controller 170 so that the controller 170 can determine a feed speed of one or more strips and/or any welding parameters. Information measured or collected by sensor(s) 180 is advantageously sent to the controller as soon as it is measured/collected, to prevent unnecessary delays in feed speed regulation/adjustment.

Figure 2:
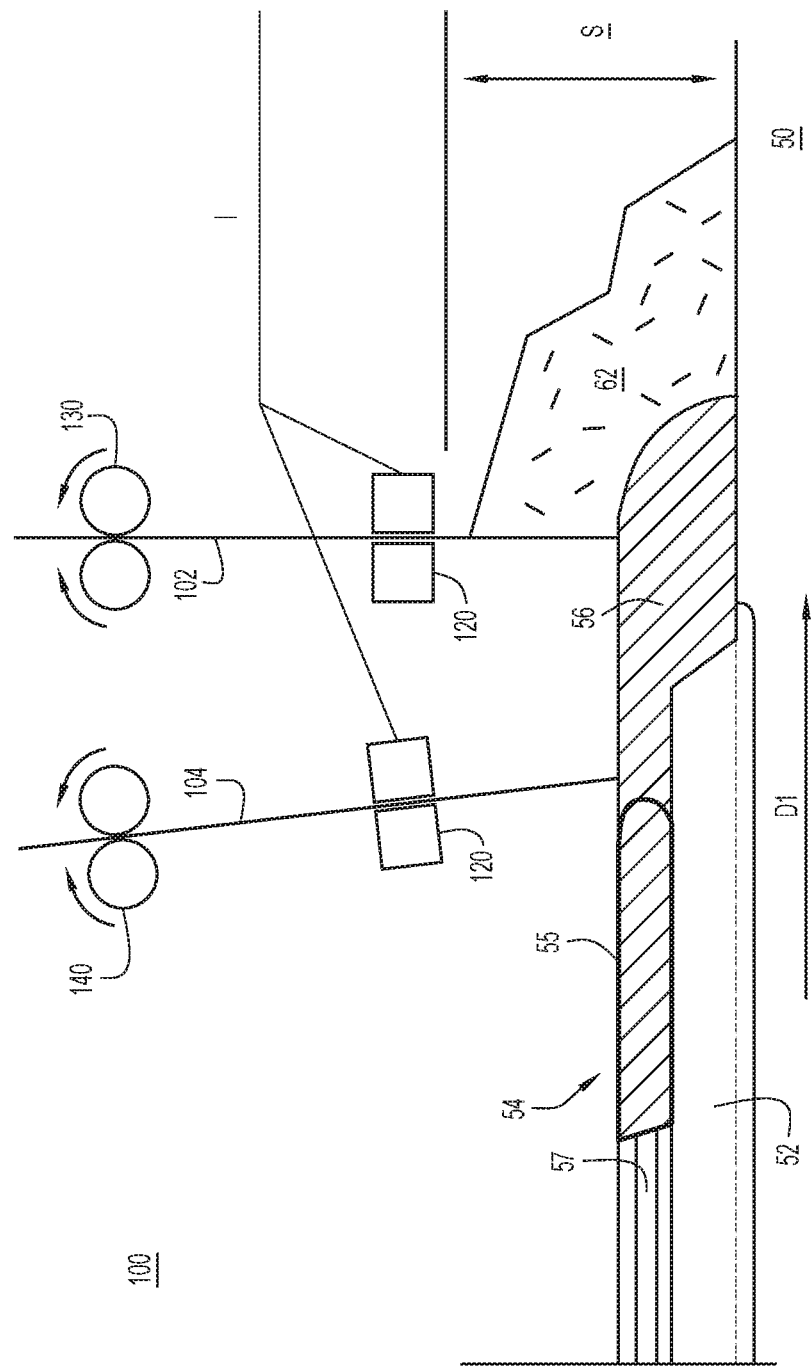
FIG. 2 is a diagram illustrating a portion of the cladding environment of FIG. 1 in further detail.

Now referring to FIG. 2, but with continued reference to FIG. 1, the apparatus 110 is generally configured to clad a work piece 50 with at least one of the first strip 102 and the second strip 104 in accordance with ESSC principles. That is, the physical principles that control the ESSC processes effectuated by apparatus 110 are substantially the same as the physical principles used for known ESSC methods, except, here, current is delivered to the strips individually and the feed rates of the strips are precisely controlled to control the rate at which the known physical principles create a cladded surface (e.g., the welds are controlled based on feed rate of the strips).

By way of example, initially, the flux drop 162 releases flux 60 and a molten slag pool 56 is formed from the first strip 102, the work piece 50, and pulverized flux 60. Once the slag pool 56 is large enough for ESSC operations (e.g., once the "stick out" of the slag pool, which is illustrated as "S" in FIG. 2, is sufficient to extinguish an electrical arc used to initially create a molten slag pool), the apparatus 110 can begin cladding operations. That is, once the slag pool is large enough, the apparatus 110 can move in the welding direction D1 and/or the work piece 50 can be moved in direction opposite to D1 to initiate ESSC operations. However, this start-up process is described only by way of background and it is to be understood that the techniques presented herein are intended for use during a welding or cladding phase, which may be a phase during which cladding action is carried out. That is, the welding phase may be the phase between a start-up phase (creation of the molten slag pool and stabilization of welding parameters) and a stop phase (termination of the welding process).

During ESSC operations, current (shown as "I") is introduced to the first strip 102 and second strip 104 at the contact jaw 120. The leading strip 102 is then brought into contact with the slag layer 54 and the current flows through the first strip 102 strip and into the layer of electrically conductive slag 54. More specifically, the current flows through the first strip 102 into a molten portion 56 of the slag layer 54. The resistance of the molten slag 56 generates heat that keeps the welding process going (e.g., the slag temperature remains at approximately 2,300° C., at least adjacent the strips). Consequently, as the ESSC operations proceed in the welding direction D1, the first strip 102 and work piece 50 are melted by the molten slag pool 56 and form a molten metal that is eventually deposited on the work piece 50 as a metal weld 52. The flux 60 also melts, at least in part, as the first strip 102 and work piece 50 are melted, creating the protective layer of slag 54 over the metal weld 52. However, at least a portion of the slag layer 54 that is extending over the weld is molten slag, as indicated at 56.

That is, molten slag 56 extends over a molten metal weld 52, so that the molten slag 56 includes a portion above the metal layer 52 and a molten slag pool at the leading edge of the metal weld 52. Eventually, the molten slag layer 56 above the metal weld 52 solidifies, as is shown at 57; however, in the depicted embodiment, the second strip 104 is quickly introduced to (i.e., incorporated or mixed into) the molten slag 56 before the molten slag 56 hardens (as indicated at 55). In fact, the trailing strip 104 actually rides on top of the slag layer 54 and since current is running through the second strip 104, the second strip 104 extends the length of the molten slag 56. For example, in the depicted embodiment, the molten slag 56 may begin to solidify approximately 50 mm-150 mm after the second strip, or even 100 mm-200 mm after the second strip. Consequently, the resultant metal weld 52 may be formed from a combination of the material of the first strip 102 and the material of the second strip 104. More specifically, the resultant weld may include a small buffering layer formed from the first strip 102 and the remaining weld 52 may be formed from a desired mix or composition of the first strip 102 and the second strip 104. Throughout this process, a layer 62 of pulverized flux protects the leading edge of the molten slag pool 56.

Figure 3:
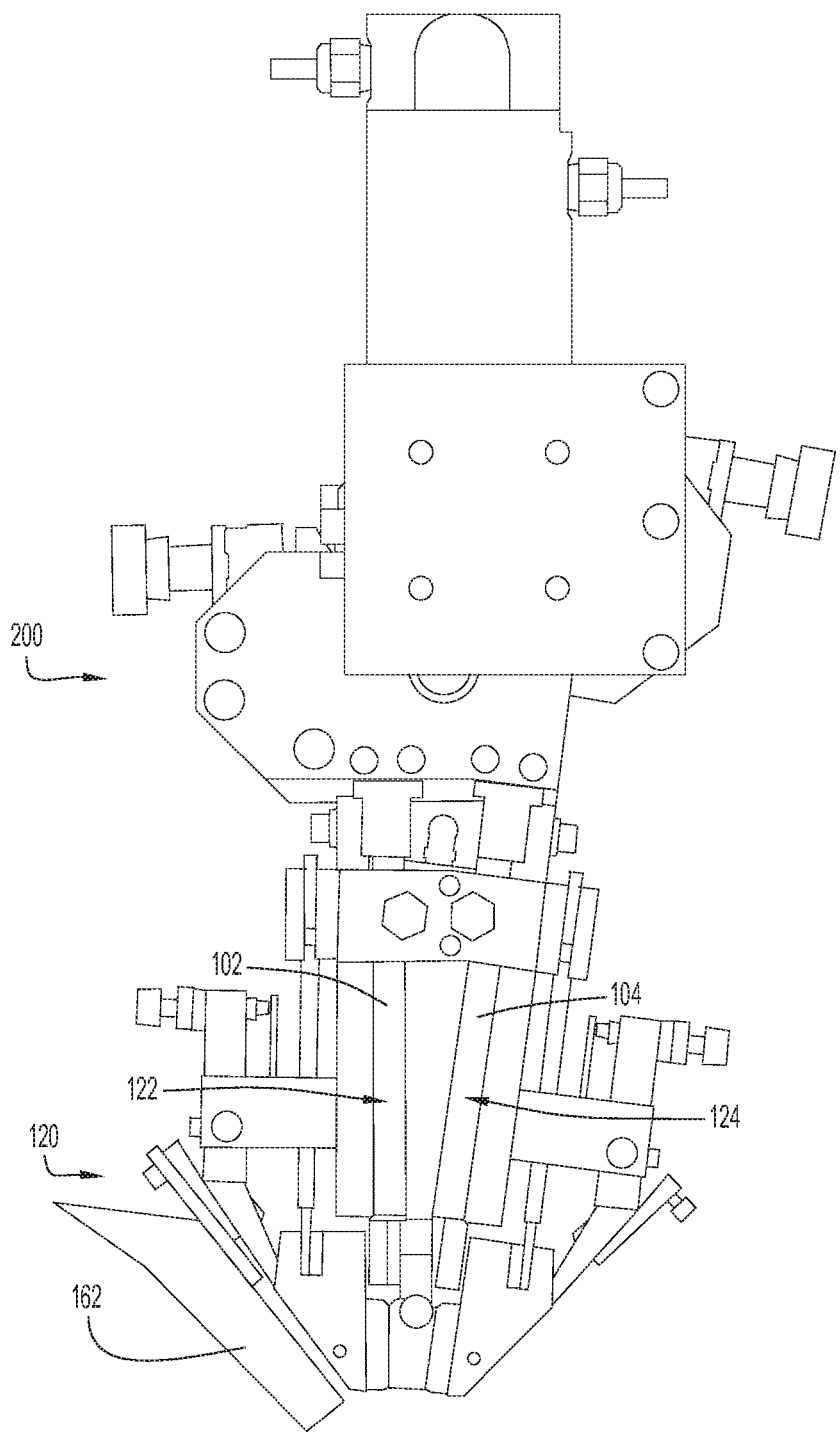
FIG. 3 is a left side view of an apparatus with which the techniques presented herein may be employed, according to an example embodiment of the present invention.

Now turning to FIG. 3, for a description of an example twin ESSC apparatus 200 (i.e., a cladding head 200) with which the techniques described herein can be utilized. In FIGS. 1 and 2, the leading edge is illustrated on the right, whereas in FIG. 3 the leading edge is illustrated on the left (i.e., FIGS. 1 and 2 illustrate an apparatus from the right side and FIG. 3 illustrates the apparatus from the left side); however, the embodiments are otherwise largely the same. Consequently, apparatus 200 has been labeled with at least some of the same reference numerals used in FIGS. 1 and 2 to illustrate how the features of apparatus 200 correspond to the features discussed above. For example, the apparatus 200 includes a contact jaw 120 configured to receive a leading strip 102 and a trailing strip 104. More specifically, the cladding head 200 includes a leading passage 122 configured to receive and guide the first strip 102 to a work piece and a trailing passage 124 configured to receive and guide the second strip 104 to the same work piece. The apparatus 200 also includes a flux drop 162 configured to create a protective layer on the leading edge of the cladding head. In this particular embodiment, the leading passage 122 and the trailing passage 124 are each configured to receive strips of a maximum width of approximately 90 mm and a maximum thickness of approximately 0.5 mm; however, in other embodiments, the cladding head 200 may receive strips of any size. The contact jaw 120 is also configured to transfer a current from a power source to the entire surface area of strips 102 and 104 disposed within the leading passage 122 and trailing passage 124.

Figure 4A:
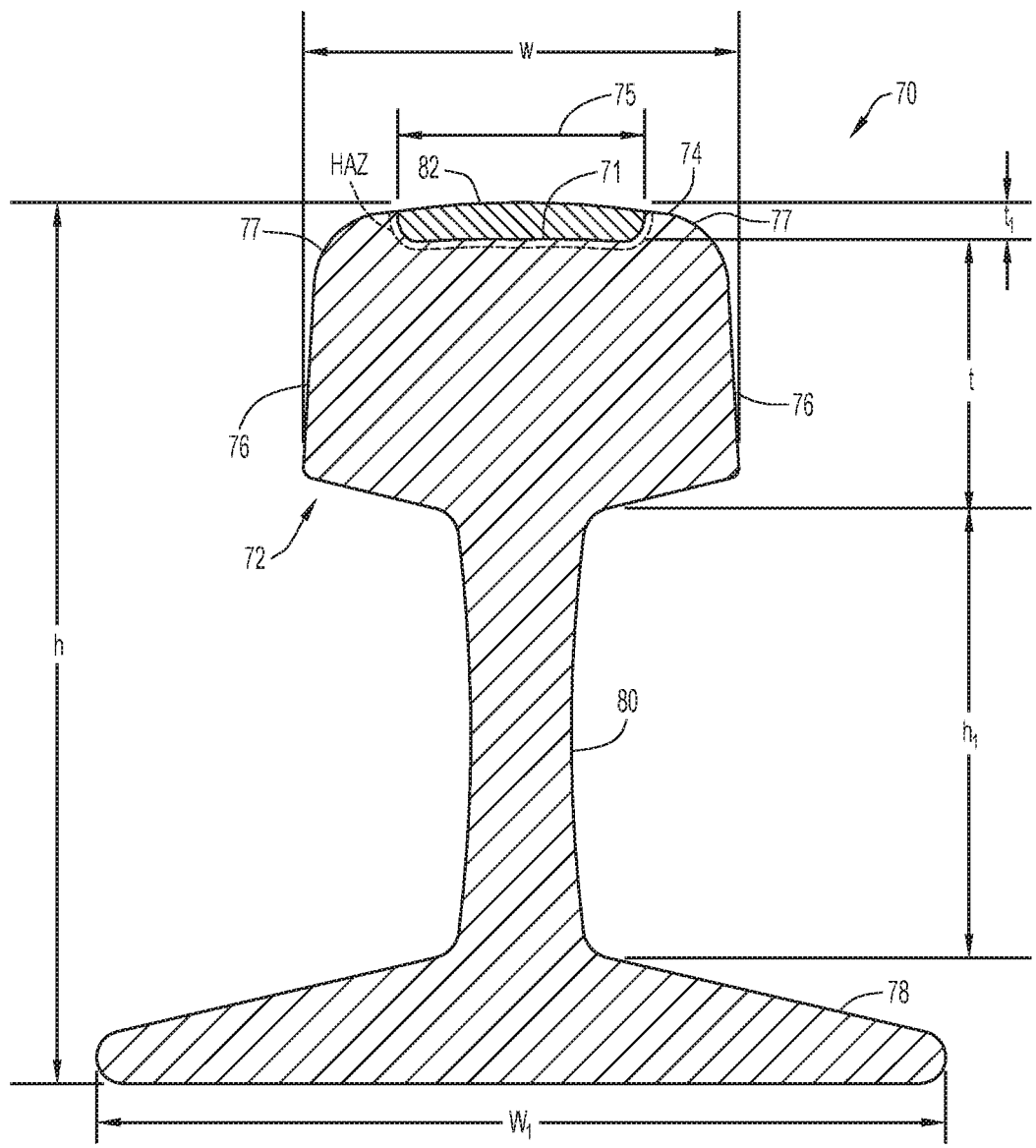
FIG. 4A is a schematic cross-sectional view illustrating a rail with cladding material deposited in a machined-out groove of the rail head by the techniques presented herein, according to an example embodiment of the present invention.

Referring now to FIG. 4A, an example embodiment of a rail 70 cladded by the techniques presented herein is shown and will now be described. The rail 70 comprises a rail head portion 72 which includes a top head portion 74, side head portions 76, and a rounded corner head portion 77 located between the top head portion 74, and each side head portion 76. A region 75 of the top head portion 74 extending in a direction into the page of FIG. 4A will be referred to as the head (or running) surface of the rail. This region of the rail is the region which most frequently comes in contact with the wheels of trains, trams, trolleys, etc., thus is subject to extensive wear and excessive corrosion, e.g., rust formation, if not patterned or coated with a specially alloyed material, such as, for example, stainless steel or nickel alloy steel.

Still referring to FIG. 4A, the region 75 of the top head portion 74 defining the head (or running) surface of rail 70 includes a machined-out groove (depression) 71. In addition, the rail 70 of the present example embodiment further includes a foot portion 78 and a neck portion 80 connecting foot portion 78 to rail head portion 72. The rail 70 is typically formed from rail steel grade, e.g., a mild or low-alloy steel, in an extruder (not shown). A layer of wear resistant alloy material (i.e., a cladding layer) 82 is deposited on the head (or running) surface of the rail head portion 72, e.g., within groove (depression) 71, to improve wear resistance, electrical connectivity, and sound damping of rail 70. The layer of wear resistant alloy material (i.e., the cladding layer) 82 may further reduce and/or eliminate the wear on the head (or running) surface of rail head portion 72. The layer of corrosion resistant (stainless) alloy material (i.e., the cladding layer) 82 may further reduce and/or eliminate the corrosion on the head (or running) surface of rail head portion 72.

In the depicted embodiment of rail 70 illustrated in FIG. 4A, the cladding layer 82 is formed on the head (or running) surface of rail head portion 72, e.g., within the machined-out groove (depression) 71, utilizing a twin-strip electroslag strip cladding (ESSC) process, as previously described herein. The process utilizes a cladding apparatus 110 to perform ESSC operations on the head (or running) surface of rail head 72 according to the techniques presented herein. Specifically, the apparatus 110 uses a twin ESSC plating or cladding head 200 configured to guide or feed a first strip of cladding material 102 and a second strip of cladding material 104 towards the head (or running) surface of the rail head 72, as discussed herein. Utilizing the twin-strip ESSC head 200 enables the layer of cladding material 82 to be deposited atop the entire head (or running) surface of rail head 72 at a relatively quick welding speed of at least about 60 cm/minute.

Furthermore, in the depicted FIG. 4A embodiment, the example rail 70 may have a height (h) between approximately 125 mm and 175 mm; rail head portion 72 may have a width (w) of approximately 75 mm and a thickness (t) of approximately 45 mm; foot portion 78 may have a width ($w_1$) of approximately 160 mm; and neck portion 80 may have a height ($h_1$) of about 155 mm. The cladding layer 82 deposited on the head (or running) surface of the rail head 72 (i.e., the region 75 of the top head portion 74 including machined-out groove (depression) 71) by the twin ESSC plating or cladding head 200 may have a thickness ($t_1$) of generally about 4.5 mm. However, the previously mentioned portions of rail 70 may have other suitable dimensions, as required, and the thickness of cladding layer 82 on the head (or running) surface of rail head 72 may be increased or reduced as necessary.

Turning now to FIGS. 5 and 6, example embodiments of transfer systems which may be utilized to move ESSC head 200 along rail 70 or, in the alternative, convey rail 70 under ESSC head 200 for deposition of a cladding material onto the head (or running) surface of rail head 72 will now be described.

With reference to FIG. 5, an embodiment of a transfer system 300 is shown in which the ESSC cladding head 200 is secured to a support structure 302 configured to permit travel of the ESSC cladding head at a predetermined speed of progression over a rail 70 sitting atop a workstation 304, with its rail head 72 uppermost, as depicted by directional arrow D2 shown in FIG. 5. In this embodiment, the support structure 302, while only illustrated in a schematic manner, is intended to serve as a characteristic example (but not limited thereto) of a motorized trolley (carriage) movable along an overhead track, rail or beam, a mobile robotic apparatus, an articulated boom assembly, a self-propelled traveling gantry, a motor-powered railcar, etc. Even though the predetermined speed of travel of ESSC cladding head 200 may vary, the travel speed of the cladding head over rail head 72 should typically be selected such that the minimum welding speed of at least approximately 60 cm/minute is maintained.

Furthermore, the support structure 302 of the FIG. 5 embodiment (e.g., the motorized trolley/carriage, the mobile robotic apparatus, the articulated boom assembly, the self-propelled traveling gantry, the motor-powered railcar, etc.) may comprise a power source, a controller, and one or more sensors (not shown). These components may be included in support structure 302 (e.g., included during manufacturing of the motorized trolley/carriage, the mobile robotic apparatus, the articulated boom assembly, the self-propelled traveling gantry, the motor-powered railcar, etc.) or connected thereto (e.g., retrofitted to the support structure, and/or connected via a wired or wireless connection). For example, the operations of the controller may be executed by components included in the power source (e.g., the controller may be a user interface and the power source may regulate the speed of progression the support structure 302—e.g., the motorized trolley/carriage, the mobile robotic apparatus, the articulated boom assembly, the self-propelled traveling gantry, the motor-powered railcar, etc.—is moved over example rail 70).

Turning now to FIG. 6, an example embodiment of another transfer system 400 is shown in which the ESSC cladding head 200 is secured to a stationary support structure 306 configured to permit a rail 70 to be advanced through a space under the ESSC cladding head 200, as depicted by directional arrow D3 shown in FIG. 6. In this embodiment, example rail 70 may be conveyed at a predetermined speed of progression under ESSC cladding head 200 by a rail feeder assembly 308. The rail feeder assembly 308, while only illustrated in a schematic manner in FIG. 6, may represent (but is not limited to) an elongate, horizontally disposed feeder bench having an approach-end section A, a run-out end section B, and a center section C at which the ESSC cladding head 200 is provided between sections A and B. The rail 70, with its rail head 72 uppermost (i.e., facing upward), may be conveyed along the feeder bench in a feeding direction from the approach-end section A to the runout-end section B, and is subjected to an electroslag operation at ESSC cladding head 200 located intermediate those sections to provide cladding metal layer 82 on the head (or running) surface of rail head 72.

In an example embodiment, the feeder bench structure of rail feeder assembly 308 may include a plurality of conveyor rollers (not illustrated for purposes of clarity) to assist with conveyance of example rail 70 from approach-end section A to the runout-end section B. In a further example embodiment, a rail feeder arrangement, such as, for example, a variable speed motorized drive unit (not shown), may be provided at the approach-end section A of the feeder bench to push rail 70 toward ESSC cladding head 200, while another rail feeder arrangement, such as, for example, a variable speed motorized drive unit (not shown) similar to the above mentioned drive unit, may be provided at the runout-end section B to pull the rail through the ESSC cladding head 200, as described herein. Each rail feeder arrangement should be configured to convey rail 70, with its rail head 72 uppermost (i.e., facing upwardly), along the feeder bench in a feeding direction from the approach-end section A, through the ESSC cladding head 200, to the runout-end section B at a predetermined speed of progression which is selected to permit the minimum welding speed of at least approximately 60 cm/minute to be maintained. The rail feeder arrangements may be configured to function in unison or separately to convey the rail 70 under the ESSC cladding head 200. However, either one of the rail feeder arrangements may be eliminated if it is not needed for conveyance of rail 70 through ESSC cladding head 200.

While the example transfer system embodiment 400, depicted in FIG. 6, permits rail 70 to be conveyed at the predetermined speed of progression under ESSC cladding head 200, other transfer systems may be utilized as well. That is, any pull-through, push-through, or other such systems now known or developed hereafter may be used to convey rail 70 at a predetermined speed of progression under ESSC cladding head 200. For example, the ESSC welding head 200 may include a feed mechanism (not shown) which enables the welding head to grab a long rail (e.g., an 18 m long rail) and pull it through under the twin-strip ESSC welding head while the cladding layer 82 is continuously deposited on the head (or running) surface of the rail 70.

Furthermore, the rail feeder arrangements and the feed mechanism of the FIG. 6 embodiment (e.g., the rail push-through arrangement at approach-end section A, the rail pull-through arrangement at run-out end section B, and the feed mechanism included as part of the ESSC welding head 200) may comprise a power source, a controller, and one or more sensors (not shown). These components may be included in the rail feeder arrangements, as well as the feed mechanism, (e.g., included during manufacturing of the rail push-through arrangement, the rail pull-through arrangement, and the rail feed mechanism of the ESSC welding head) or connected thereto (e.g., retrofitted to each of the push-through and pull-through rail feeder arrangements, as well as the rail feed mechanism of the ESSC welding head, and/or connected via a wired or wireless connection). For example, the operations of the controller may be executed by components included in the power source (e.g., the controller may be a user interface and the power source may regulate the speed of progression the rail feeder arrangements push or pull rail 70 under ESSC cladding head 200, or the rail feed mechanism of the ESSC cladding head pulls rail 70 under ESSC cladding head 200).

Moreover, the ESSC welding head 200 of the FIG. 5 and FIG. 6 embodiments may further include a reversible stepping motor unit (not shown) that permits the ESSC welding head 200 to be vertically adjusted towards and away from workstation 304 or the feeder bench of rail feeder assembly 308, respectively. Vertically moving the ESSC welding head towards and away from the workstation of the FIG. 5 embodiment and the feeder bench of the FIG. 6 embodiment permits the working space under the ESSC cladding head 200 and/or the working space above the head (running) surface of rail head portion 72 to be controlled such that rails of various sizes (e.g., rails of different heights) may be accommodated and the region defining the running surface can be cladded under appropriate operating conditions.

Figure 7:
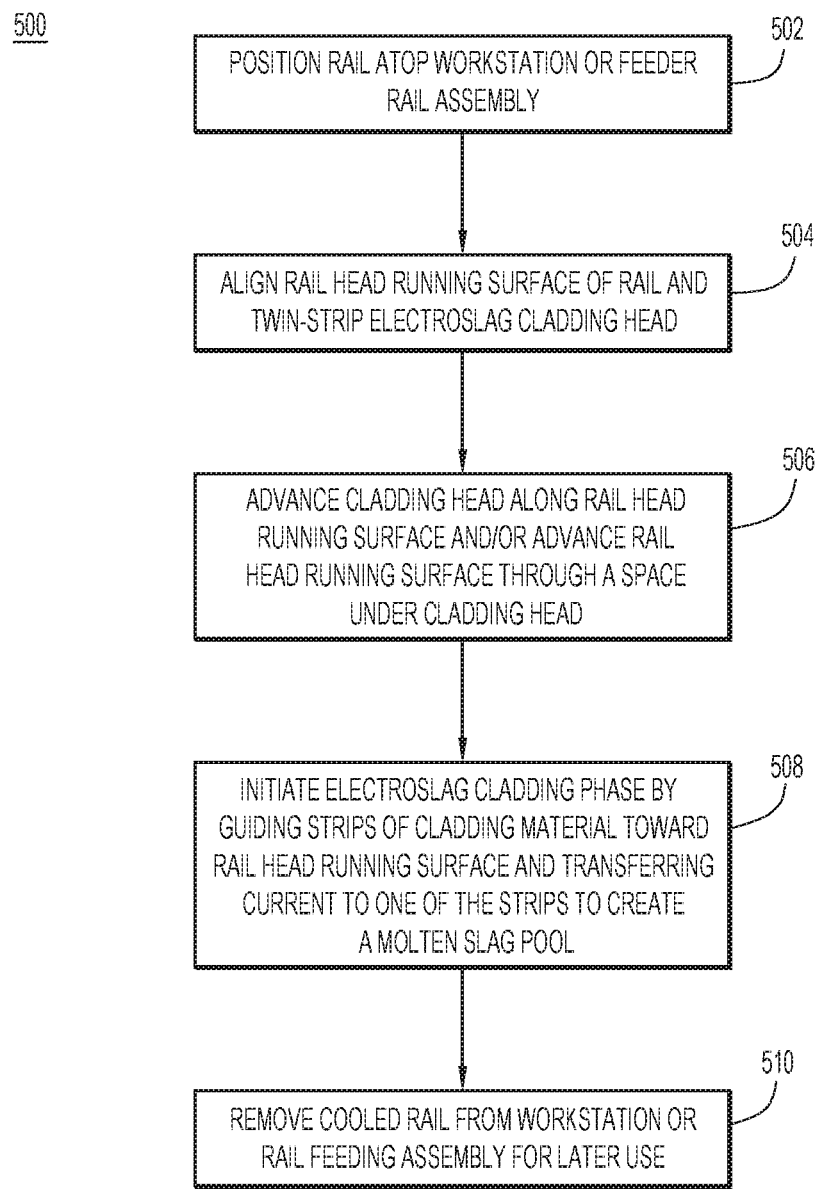
FIG. 7 is an illustration of a flowchart depicting an example method with which the techniques presented herein may be implemented to clad a rail head, according to an example embodiment of the present invention.

With reference now to FIG. 7, a description is provided of a method 500 for electroslag welding operations utilizing twin feed strips. For clarity, the operations depicted in FIG. 7 are described as being performed by ESSC apparatus 200 utilizing twin feed strips 102, 104 according to the techniques described herein; however, this is not intended to be limiting and, in other embodiments, these operations may be performed, executed, or caused to execute by any other suitable entity.

Initially, at step 502, a rail to be cladded, e.g., a rail having a configuration such as example rail 70 with a machined-out groove (depression) 71, as illustrated in FIG. 4B (but without cladding layer 82) is positioned atop a workstation, e.g., workstation 304 depicted in FIG. 5, or a rail feeder assembly, e.g., feeder bench, 308 depicted in FIG. 6. As described herein and shown in FIG. 4A, the example rail 70 comprises a rail head portion 72 which includes a top head portion 74, side head portions 76, and a rounded corner head portion 77 located between the top head portion 74, and each side head portion 76. In at least some embodiments, a surface region 75 of the top head portion 74, between the corner head portions 76 and extending in a direction into the page of FIG. 4A, defines a head (or running) surface of example rail 70. The head (or running) surface, as mentioned herein, may include a groove (depression) 71 machined into the top head portion 74. In addition, the example rail 70 further comprises a foot portion 78 and a neck portion 80 connecting foot portion 78 to rail head portion 72.

Thereafter, at step 504, the example rail 70 and twin-strip ESSC plating or cladding head 200 are aligned such that the running surface of example rail 70 (i.e., the surface region 75 of the top head portion 74 with groove (depression) 71) may subsequently have a metal alloy cladding layer 82 deposited and fused thereto by the ESSC welding process described herein.

Next, at step 506, the cladding process is initiated with the ESSC cladding head 200 according to the techniques described herein. In one embodiment of the present invention depicted in FIG. 5, movement of support structure 302 is commenced to transport ESSC plating or cladding head 200 at a predetermined speed of progression (e.g., a controlled rate to maintain a welding speed of at least approximately 60 cm/minute) over example rail 70 sitting atop workstation 304, with its rail head 72 uppermost, to overlay and fuse cladding material 82, such as (but not limited to) stainless steel or nickel alloy steel, to the running surface of example rail 70 at a deposition rate of, for example, approximately 54-65 kg/hour utilizing the abovementioned electroslag surfacing process, which yields a continuous, seam-free cladding (overlay) across the running surface of example rail 70. As mentioned herein, the support structure 302 may be (but is not limited to) a motorized trolley (carriage) movable along an overhead track, rail or beam, a mobile robotic apparatus, an articulated boom assembly, a self-propelled traveling gantry, a motor-powered railcar, etc.

In another embodiment of the present invention depicted in FIG. 6, at step 506, the example rail 70 is pushed or pulled through a space under stationary ESSC cladding head 200 at a predetermined speed of progression (e.g., a controlled rate to maintain a welding speed of at least approximately 60 cm/minute) by a rail feeder assembly 308, which may include an elongate, horizontally disposed feeder bench as described herein, so that overlay material (cladding) 82, such as (but not limited to) stainless steel or nickel alloy steel, may be deposited and fused to the running surface of example rail 70 at a deposition rate of, for example, approximately 54-65 kg/hour utilizing the abovementioned electroslag surfacing process, which yields a continuous, seam-free cladding (overlay) across the full width of the running surface. However, other suitable rail feeder assemblies may be employed as needed.

At step 508, the ESSC start-up phase is initiated by guiding first and second strips of cladding material 102, 104 towards the workpiece (e.g., exemplary rail 70); transferring a current to at least one of the first and second strips of cladding material 102, 104 to melt flux 60, one or more of the strips 102, 104, and a portion of the workpiece to be cladded (e.g., head/running surface of rail head 72), as described above in connection with FIG. 2, to create a molten slag pool 56 on the workpiece (e.g., head/running surface of rail head 72) that is sufficient to initiate the cladding phase; and feeding the first strip of cladding material 102 towards the molten slag pool 56 at a first variable feed speed and the second strip of cladding material 104 towards the molten slag pool 56 at a second variable feed speed that is different from the first variable feed speed to continuously deposit seam-free cladding material 82 atop the workpiece (e.g., across the full width of the running surface of rail head 72).

Figure 4C:
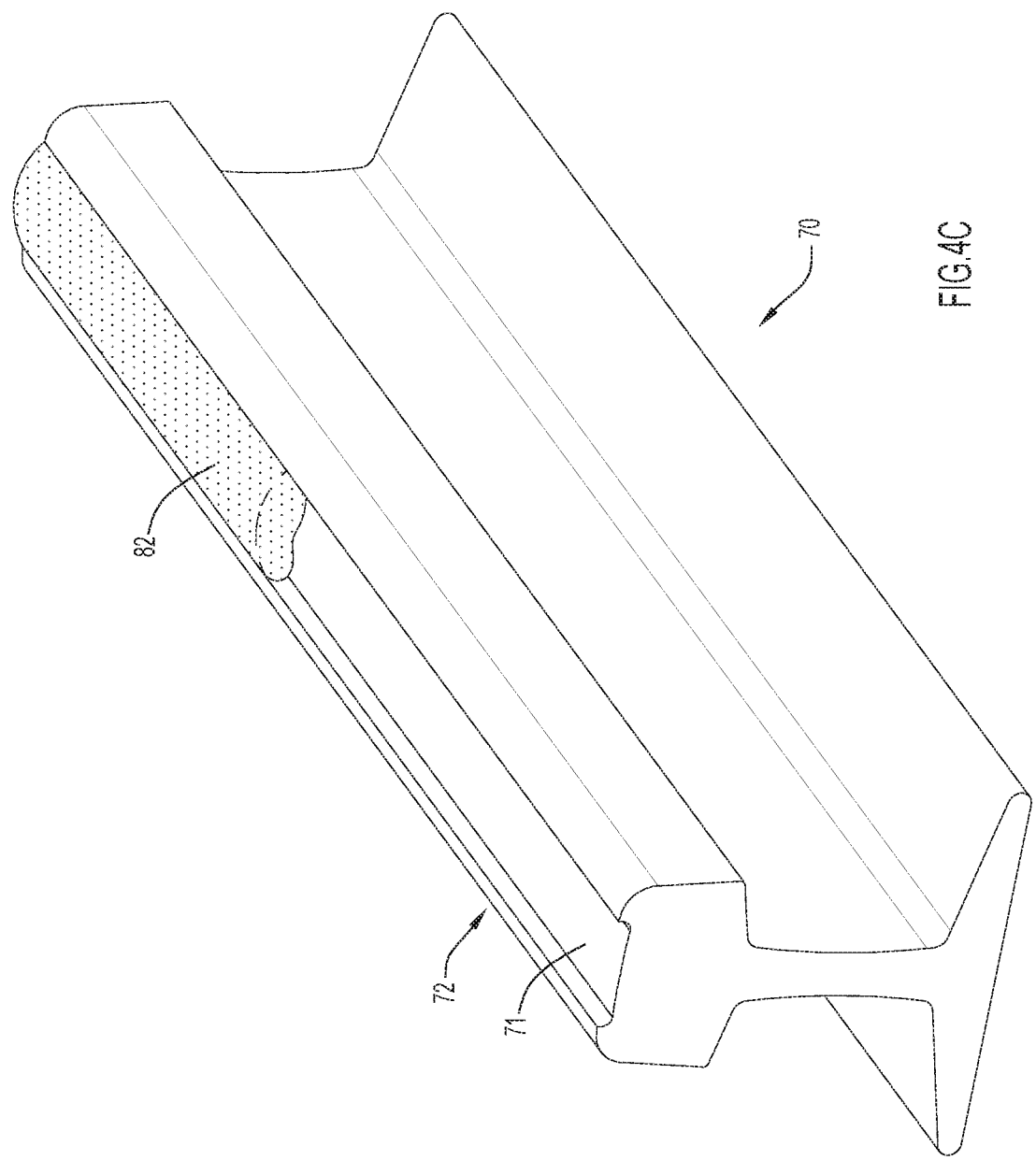
FIG. 4C is a schematic perspective view of the rail of FIG. 4B depicting the machined-out groove of the rail head with cladding material deposited in a portion of the groove by the techniques presented herein, according to an example embodiment of the present invention.

More specifically, the cladding material 82 is continuously deposited seam-free by ESSC cladding head 200 into the machined-out groove (depression) 71 in region 75 of the top head portion 74. For example, cladding material 82 may be deposited within groove (depression) 71 to a height which is slightly higher than the original head (or running) surface of the head rail 72 (e.g., a thickness which may be slightly greater than generally about 4.5 mm), as shown in FIG. 4C, such that the cladding material may, thereafter, be milled down to form a smooth contoured surface that substantially conforms to the contour of the original head (running) surface of the top head portion 74 of rail head 72, as shown in FIG. 4A. However, the thickness of cladding layer 82 deposited within groove (depression) 71 on the head (or running) surface of rail head 72 may be increased or reduced as necessary. Further, it may be possible to utilize the ESSC cladding head 200 to deposit cladding material 82 within the machined-out groove (depression) 71 that conforms to the contour of the original head (running) surface of the top surface portion 74 of rail head 72 without a subsequent milling operation.

Notably, as previously mentioned herein, the rail 70 does not need to be preheated prior to cladding rail head 72 with cladding material 102 and 104. This is because ESSC processes generate enough (sufficient) heat to ensure proper microstructure formation in the cladding layer and, more importantly, in a heat affected zone (HAZ) of the rail head (illustrated by the dashed line in FIG. 4A) without preheating. In FIG. 4A, a dashed line in FIG. 4A generally depicts the HAZ as surrounding the cladding material layer 82 and machined-out groove (depression) 71; however, typically, the HAZ will include a high temperature area or layer and a lower temperature area or layer, which are not illustrated for purposes of clarity. Generally, the thickness of the HAZ generally may be within a range of about 1-3 mm. However, the thickness of the HAZ could be slightly greater or less than 1-3 mm depending on production and fabrication requirements, as well as operating efficiency.

Regardless of the specific size of the HAZ, due to the intense heat generated during cladding with ESSC cladding head 200 (as mentioned above, the slag pool may be maintained at a temperature of approximately 2,300° C.), the example rail 70 will be heated with sufficient heat to provide a cooling time that will not create defects in the microstructures (e.g., molecular bonds) of the cladding layer 82 and the HAZ of the rail steel. That is, the heat input from the ESSC will be high enough to cause a natural avoidance (or at least discourages) austenite-to-martensite transformation and the detrimental phase transformations associated therewith. Notably, although martensite phase steel is exceptionally hard, it may also be brittle (owing to the needle-shaped features of the martensite microstructure). Thus, in rails, martensite phase steel may provide a point at which a crack or other such unwanted defect can initiate.

Put still another way, the high heat input of the ESSC naturally slows the cooling rate of the HAZ, which prevents or at least discourages austenite-to-martensite transformation. Specifically, austenite is generally only evident between approximately 700° C. and 1500° ° C. and martensite transformation generally occurs under approximately 500° C.; thus, the intense 2,300° C. slag pool will prevent or discourage cooling in the HAZ (or at least the high temperature HAZ) that causes austenite-to-martensite transformation. Instead, due to the intense heat input of the ESSC, the HAZ will experience ferritic, perlitic and bainitic transformations, which provide a less brittle microstructure as compared to martensite phase steel. Notably, pearlite may be formed during the slow cooling of austenite and can begin at a temperature of 1150° C. to 723° C., while ferrite can form within a subset of the temperature ranges of pearlite by the slow cooling of austenite. Bainite is typically formed at cooling rates slower than that for martensite formation and faster than that for ferrite and pearlite formation.

That said, in some instances, the example rail 70 might be preheated to prevent distortion along the length of the rail; however, this preheating may be less intensive and have minimal impact on the microstructure formation in the cladding layer. Moreover, preheating may be unnecessary for rails 70 of shorter lengths and may only be helpful for rails of substantially longer lengths (e.g., rails longer than 10 m, longer than 15 m, etc.).

Moreover, during step 506, the cladding techniques presented herein (e.g., employing twin strip ESSC welding processes utilizing a twin-strip ESSC welding head 200) may deposit a cladding layer (formed from the two or more strips of cladding material, for example, first cladding material strip 102 and second cladding material strip 104) that is maximum 50 mm wide and 3 to 5 mm thick through the variation of welding speed of approximately 30 to 80 cm/minute and a deposition rate of at least approximately 54-65 kg/hour. By comparison, known welding processes cannot provide a cladding layer of similar dimensions at the above noted welding speed and disposition rate. For example, known welding processes cannot provide welding speeds higher than 30 cm/minute and a deposition rate higher than about 20-27 kg/hour if a cladding material of approximately 40 mm wide and a minimum of approximately 2 mm thick is to be deposited on a workpiece. Furthermore, during step 506, the cladding techniques presented herein may only generate 1 cm/meter or less of distortion (e.g., approximately 2.6 mm/m of distortion). By comparison, known welding processes may generate minimum 3-4 cm/meter of distortion or more.

At step 510, the cladded rail 70 is subsequently permitted to cool and, thereafter, removed from workstation 304 or rail feeder assembly 308 for later use as transit rails for trains, trams, trolleys, etc. Thus, the rail 70 with its metal cladding layer 82 (e.g., stainless steel or nickel alloy steel) deposited atop the running surface of rail 70 provides performance enhancements, such as much improved corrosion (rust) resistance.

To summarize, the embodiments of the present invention are directed to an ESSC process and system which utilizes twin-strips of cladding material to deposit (i.e., weld) a metal cladding layer onto the head (or running) surface of a rail. The head (or running) surface of the rail may include a machined-out groove (depression) therein, as shown in FIGS. 4A and 4B. Moreover, the disclosed twin ESSC process/system offers many advantages over previous rail cladding processes, for example: quicker welding speeds (e.g., minimum welding speed of approximately 60 cm/minute) with less distortion (e.g., less than 1 cm/meter); higher deposition rates (e.g., 54-65 kg/hour); reduced dilution of base material (e.g., about 10%); none or lower preheating temperature; and lower flux consumption (e.g., about 0.6 kg/kg of strip). In addition, the higher deposition rate, combined with increased travel speed, reduces welding (cladding) time and improves productivity for manufacturing and fabrication applications.

Thus, in one form, a method is provided comprising: (a) positioning on a workstation or a rail feed assembly a rail with a rail head portion having a head (running) surface with a machined-out groove (depression) therein; (b) aligning a twin-strip ESSC welding head above the machined-out groove (depression) of the head (running) surface of the rail; (c) guiding a first strip and a second strip towards the rail; (d) transferring a current to at least one of the first strip and the second strip to create a molten slag pool on the head (running) surface of the rail sufficient for initiation of a cladding phase; (e) feeding the first strip towards the molten slag pool at a first variable feed speed; (f) feeding the second strip towards the molten slag pool at a second variable feed speed that is different from the first variable speed; (g) advancing the ESSC welding head at a predetermined travel speed of progression along the rail positioned on the workstation or, in the alternative, advancing the rail positioned on the rail feeder assembly through a space under the ESSC welding head at a predetermined travel speed of progression; and (h) continuously depositing seam-free metal cladding material across the full width of the machined-out groove (depression) in the region defining the head (running) surface of the rail.

In yet another form, a system is provided comprising: (a) an ESSC welding head which includes a first strip feeder configured to guide a first strip towards a rail, and a second strip feeder configured to guide a second strip towards the rail; (b) a power source configured to transfer a current to at least one of the first strip and the second strip to create a molten slag pool on a head (running) surface of the rail sufficient for initiation of a cladding phase; (c) a transfer system configured to permit travel of the ESSC cladding head at a predetermined speed of progression over the rail or, in the alternative, to permit the rail to be advanced through a space under the ESSC cladding head; and (d) a controller configured to: (i) cause the first strip feeder to feed the first strip towards the molten slag pool at a first variable feed speed, (ii) cause the second strip feeder to feed the second strip towards the molten slag pool at a second variable feed speed that is different from the first variable speed, and (iii) cause metal cladding material to be continuously deposited seam-free across the full width of a machined-out groove (depression) in the region defining the head (running) surface of the rail.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

I claim:

1. A method of cladding a rail, comprising:
   providing a rail including a rail head portion having a region defining a running surface;
   aligning an electroslag strip cladding (ESSC) welding head having twin strips of cladding material above the rail head portion, wherein the twin strips define a first strip of cladding material and a second strip of cladding material;
   guiding the first strip and the second strip towards the rail head portion;
   transferring a current to at least one of the first strip and the second strip to create a molten slag pool on the rail head portion sufficient for initiation of a cladding phase; and
   advancing the ESSC welding head at a predetermined travel speed of progression along the rail head portion during the cladding phase to deposit a cladding layer comprised of the first strip and the second strip across the region defining the running surface of the rail head portion,
   wherein the advancing further comprises depositing the cladding layer across the region defining the running surface of the rail head portion without preheating the rail.

2. The method of cladding a rail of claim 1, further comprises:
   feeding the first strip towards the molten slag pool at a first variable feed speed; and
   feeding the second strip towards the molten slag pool at a second variable feed speed that is different from the first variable feed speed.

3. The method of cladding a rail of claim 1, wherein the advancing further comprises:
   advancing the ESSC welding head along the rail head portion during the cladding phase at a controlled rate to maintain a welding speed of at least 60 cm/minute.

4. The method of cladding a rail of claim 1, wherein the advancing further comprises:
   depositing the cladding layer across the region defining the running surface of the rail head portion at a disposition rate greater than 54 kg/hour.

5. The method of cladding a rail of claim 1, further comprising:
   machining-out a groove in the running surface of the rail head portion prior to initiation of the cladding phase.

6. The method of cladding a rail of claim 1, further comprising:
   positioning the rail atop a workstation with the region defining the running surface of the rail head portion facing upward; and
   securing the ESSC welding head to a movable support structure configured to permit travel of the welding head at the predetermined travel speed of progression over the rail sitting atop the workstation to deposit the cladding layer across the region defining the running surface of the rail head portion.

7. A method of cladding a rail, comprising:
   providing a rail including a rail head portion having a region defining a running surface;
   aligning the region of the rail head portion defining the running surface with an electroslag strip cladding (ESSC) welding head having twin strips of cladding material, wherein the twin strips define a first strip of cladding material and a second strip of cladding material;
   guiding the first strip and the second strip towards the rail head portion;
   transferring a current to at least one of the first strip and the second strip to create a molten slag pool on the rail head portion sufficient for initiation of a cladding phase; and
   advancing the rail under the ESSC welding head at a predetermined travel speed of progression during the cladding phase to deposit a cladding layer comprised of the first strip and the second strip across the region defining the running surface of the rail head portion,
   wherein the advancing further comprises depositing the cladding layer across the region defining the running surface of the rail head portion without preheating the rail.

8. The method of cladding a rail of claim 7, further comprises:
   feeding the first strip towards the molten slag pool at a first variable feed speed; and feeding the second strip towards the molten slag pool at a second variable feed speed that is different from the first variable feed speed.

9. The method of cladding a rail of claim 7, wherein the advancing further comprises:
advancing the rail under the ESSC welding head during the cladding phase at a controlled rate to maintain a welding speed of at least 60 cm/minute.

10. The method of cladding a rail of claim 7, further comprises:
securing the ESSC welding head to support structure configured to permit the rail to be advanced through a space under the welding head; and
wherein the advancing further comprises:
advancing the rail, with the region defining the running surface of the rail head portion facing upward, at the predetermined travel speed of progression through the space under the ESSC welding head using a rail feeder assembly.

11. The method of cladding a rail of claim 10,
wherein the rail feeder assembly comprises a feeder bench structure having an approach-end section and an opposed run-out end section, the ESSC welding head being located intermediate the opposed end sections; and
wherein the advancing further comprises:
pushing the rail in a feeding direction from the approach-end section, through the space under the ESSC welding head, to the opposed run-out end section at a controlled rate to maintain a welding speed of at least 60 cm/minute.

12. The method of cladding a rail of claim 10,
wherein the rail feeder assembly comprises a feeder bench structure having an approach-end section and an opposed run-out end section, the ESSC welding head being located intermediate the opposed end sections; and
wherein the advancing further comprises:
pulling the rail in a feeding direction from the approach-end section, through the space under the ESSC welding head, to the opposed run-out end section at a controlled rate to maintain a welding speed of at least 60 cm/minute.

13. The method of cladding a rail of claim 10,
wherein the rail feeder assembly comprises a feeder bench structure having an approach-end section and an opposed run-out end section, the ESSC welding head being located intermediate the opposed end sections; and
wherein the advancing further comprises:
pushing and pulling the rail in a feeding direction from the approach-end section, through the space under the ESSC welding head, to the opposed run-out end section at a controlled rate to maintain a welding speed of at least 60 cm/minute.

14. The method of cladding a rail of claim 7, further comprising:
machining-out a depression in the region defining the running surface of the rail head portion prior to initiation of the cladding phase, and
wherein the advancing further comprises:
depositing the cladding layer within the depression of the region defining the running surface of the rail head portion without preheating the rail.

15. The method of cladding a rail of claim 7, wherein the advancing further comprises:
advancing the rail, with the region defining the running surface of the rail head portion facing upward, through a space under the ESSC welding head at a controlled rate to maintain a welding speed of at least 60 cm/minute and a disposition rate of at least 54 kg/hour.

16. A system for cladding a rail including a rail head portion having a region defining a running surface, comprising:
an electroslag strip cladding (ESSC) welding head including:
a first strip feeder configured to guide a first strip of cladding material towards the rail head portion;
a second strip feeder configured to guide a second strip of cladding material towards the rail head portion;
a power source configured to transfer a current to at least one of the first strip and the second strip to create a molten slag pool on the rail head portion sufficient for initiation of a cladding phase; and
a transfer apparatus configured to:
advance the ESSC welding head at a first predetermined speed of progression over the rail head portion of the rail during the cladding phase to deposit a molten cladding layer comprised of the first strip and the second strip across the region defining the running surface;
advance the rail head portion of the rail at a second predetermined speed of progression through a space under the ESSC welding head during the cladding phase to deposit the molten cladding layer comprised of the first strip and the second strip across the region defining the running surface; or
advance the ESSC welding head at a third predetermined speed of progression over the rail head portion of the rail while also advancing the rail head portion of the rail at a fourth predetermined speed of progression through the space under the ESSC welding head during the cladding phase to deposit the molten cladding layer comprised of the first strip and the second strip across the region defining the running surface,
wherein the transfer apparatus advances the ESSC welding head over the rail head portion of the rail and/or the rail head portion of the rail through the space under the ESSC welding head without the rail being preheated prior to depositing the molten cladding layer across the region defining the running surface of the rail.

17. The system for cladding a rail of claim 16, wherein the transfer apparatus is configured to advance the ESSC welding head over the rail head portion of the rail at a controlled rate to maintain a welding speed of at least 60 cm/minute.

18. The system for cladding a rail of claim 16, wherein the transfer apparatus is configured to advance the rail head portion of the rail through the space under the ESSC welding head at a controlled rate to maintain a welding speed of at least 60 cm/minute.

19. The system for cladding a rail of claim 16, wherein the first strip feeder is configured to guide the first strip towards the molten slag pool at a first variable feed speed, and the second strip feeder is configured to guide the second strip towards the molten slag pool at a second variable feed speed that is different from the first variable feed speed.

* * * * *

UNITED STATES PATENT AND TRADEMARK OFFICE
CERTIFICATE OF CORRECTION

PATENT NO. : 12,060,683 B2
APPLICATION NO. : 16/820874
DATED : August 13, 2024
INVENTOR(S) : Tamás Sándor Page 1 of 1

It is certified that error appears in the above-identified patent and that said Letters Patent is hereby corrected as shown below:

In the Specification

Column 13, Line 65, change "perlitic" to --pearlitic--.

Signed and Sealed this
Twenty-ninth Day of October, 2024

Katherine Kelly Vidal
*Director of the United States Patent and Trademark Office*